US007373803B2

(12) United States Patent
Bruckmann

(10) Patent No.: US 7,373,803 B2
(45) Date of Patent: May 20, 2008

(54) DRIVER CIRCUIT FOR AN ION MEASUREMENT DEVICE

(75) Inventor: Thomas Bruckmann, Wasserliesch (DE)

(73) Assignee: Delphi Technologies, Troy, MI (US)

( * ) Notice: Subject to any disclaimer, the term of this patent is extended or adjusted under 35 U.S.C. 154(b) by 870 days.

(21) Appl. No.: 10/868,366

(22) Filed: Jun. 15, 2004

(65) Prior Publication Data

US 2004/0257083 A1 Dec. 23, 2004

(30) Foreign Application Priority Data

Jun. 20, 2003 (EP) ................................. 03013951

(51) Int. Cl.
*G01M 15/00* (2006.01)

(52) U.S. Cl. ..................................... 73/35.08; 73/117.2

(58) Field of Classification Search ............... 73/35.01, 73/35.07, 35.08, 116, 117.2, 117.3, 118.1; 324/378

See application file for complete search history.

(56) References Cited

U.S. PATENT DOCUMENTS 4,635,594 A * 1/1987 Ichikawa et al. ........ 123/179.6
6,550,456 B1 * 4/2003 Uchida et al. .............. 123/479
6,813,932 B2 * 11/2004 Nishimoto et al. ........ 73/35.08
2002/0036192 A1 * 3/2002 Sato et al. .................. 219/270
2005/0092287 A1 * 5/2005 Tozzi et al. ................. 123/305
2007/0247164 A1 * 10/2007 Bengtsson .................. 324/393

FOREIGN PATENT DOCUMENTS

| | | |
|---|---|---|
| EP | 1113170 | 7/2001 |
| EP | 1164286 | 12/2001 |
| EP | 1233177 | 8/2002 |
| FR | 2675206 | 10/1992 |

OTHER PUBLICATIONS

EP Search Report dated Nov. 27, 2003.

* cited by examiner

*Primary Examiner*—Eric S. McCall
(74) *Attorney, Agent, or Firm*—Paul L. Marshall

(57) ABSTRACT

A driver circuit is described for an ion measuring device associated with a cylinder of a diesel engine for the measurement of the conductivity of the combustion gas present in the cylinder, wherein a negative voltage can be applied by the driver circuit to a glow plug serving as a sensor and associated with the cylinder for a respective ion measurement. The negative voltage is generated by a capacitor which is correspondingly charged each time the glow plug is switched off via the magnetic energy stored in the internal inductance of the glow plug.

20 Claims, 1 Drawing Sheet

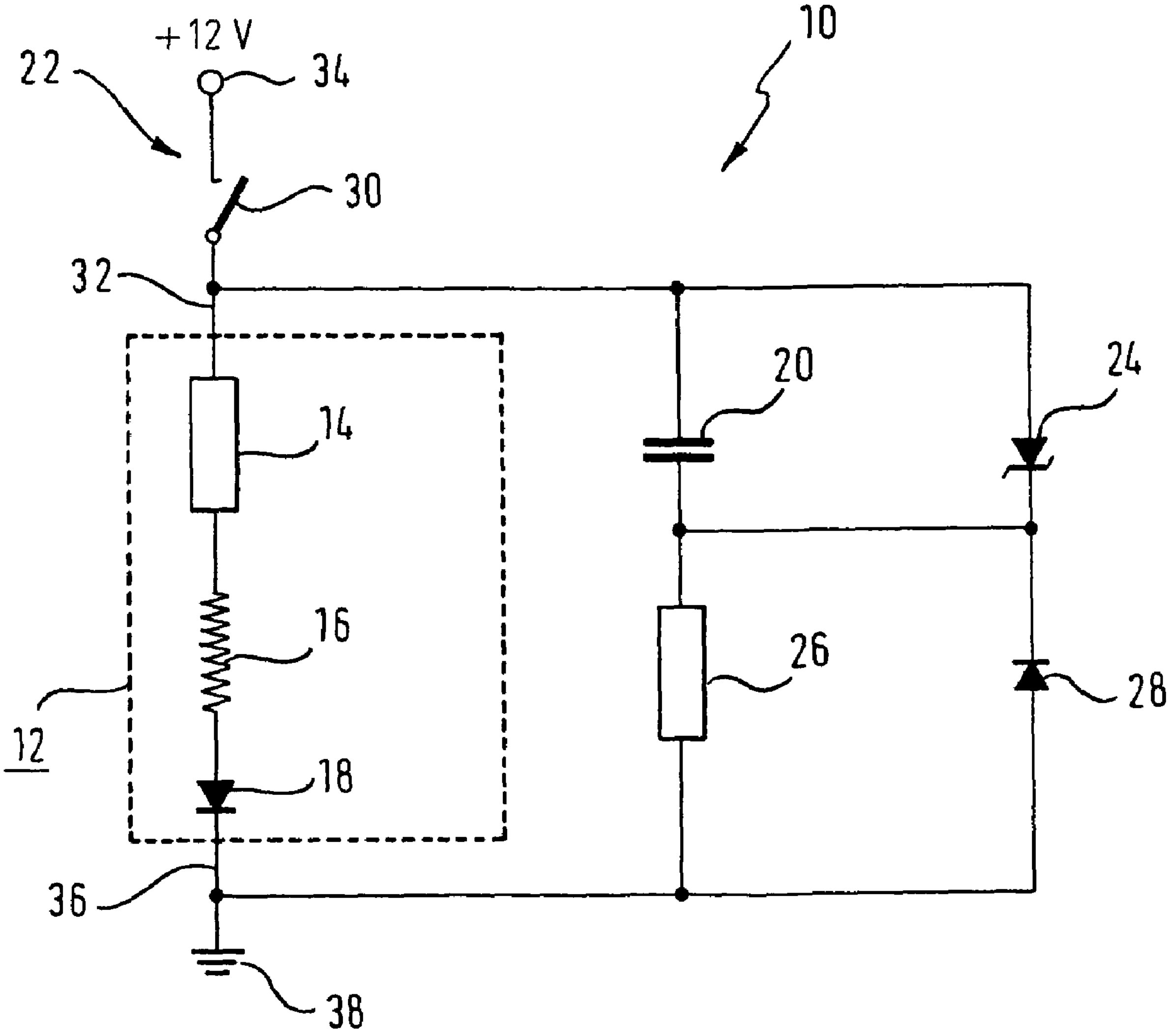
+12 V
10
22
34
30
32
20
24
14
16
26
28
12
18
36
38

DRIVER CIRCUIT FOR AN ION MEASUREMENT DEVICE

TECHNICAL FIELD

The invention relates to a driver circuit for an ion measuring device associated with a cylinder of a diesel engine for the measurement of the conductivity of the combustion gas present in the cylinder, wherein a negative voltage can be applied by said driver circuit to a glow plug serving as a sensor and associated with the cylinder for a respective ion measurement.

BACKGROUND OF THE INVENTION

In order to measure the conductivity of the combustion gas present in a cylinder of a diesel engine, the glow plug of the cylinder can be used as a sensor and a respective ion measurement can take place via said glow plug. The glow plug of the respective cylinder can be connected in series with a measurement or reference resistor and can in particular be conductively connected to the interior wall of the cylinder. An electrical voltage is applied to the glow plug for the determination of the conductivity of the combustion gas. If the conductivity of the combustion gas should be determined on the basis of the positively charged particles contained in the combustion gas, a negative voltage can be applied to the glow plug, for example, during part of the compression stroke and during part of the power stroke of the piston of the relative cylinder. The conductivity of the combustion gas between the glow plug and the interior wall of the cylinder changes due to the positively charged particles arising during the combustion process, whereby the voltage changes which drops at the measurement or reference resistor and which is measured and output as a measured signal.

In all cases in which ion measurements are carried out using a voltage which is different from the voltages present in the control unit of the relevant vehicle, a second power supply is required. For different technical reasons, a negative voltage is applied to the glow plug in many cases to carry out a respective ion measurement. Negative potential is applied to the glow plug terminal and positive potential to the plug end at the ground side. The current flow between the plug tip and the cylinder head determines the shape and amplitude of the ion measurement signal during the combustion process.

Up to now, a second power supply always had to be integrated into the control device or into the glow plug controller in order to provide the negative voltage. For this purpose, for example, a DC-DC converter or a charge pump can be used. Such solutions are, however, relatively complex and expensive.

SUMMARY OF THE INVENTION

It is the underlying object of the invention to provide an improved driver circuit of the initially named kind with which the previously named problems are eliminated. In particular a relatively simple and correspondingly cost-favourable design of the driver circuit should be achieved.

This object is satisfied in accordance with the invention in that the negative voltage is generated by means of a capacitor which is appropriately charged each time the glow plug is switched off via the magnetic energy stored in the internal inductance of the glow plug.

Means are advantageously provided by which the negative voltage generated at the capacitor is restricted to a pre-set value.

Means are also preferably provided which prevent a positive voltage being generated at the capacitor by a corresponding charge or charge switch of the capacitor.

In an expedient practical embodiment of the driver circuit in accordance with the invention, the glow plug serving as a sensor is connected to a measurement resistor. The negative voltage generated by means of the capacitor can preferably be applied to a series circuit including the glow plug and the measurement resistor.

Means are advantageously also provided by which the measurement resistor is bridged when the glow plug serving as a sensor us switched off.

In the switched-on state, the glow plug serving as a sensor is expediently connected to a power supply, in particular to the power supply of the relevant motor vehicle. In particular a positive voltage can be applied to the glow plug via this power supply.

In the switched-off state of the glow plug serving as a sensor, the connection to the power supply is interrupted. In this phase, the glow plug is therefore expediently only charged by the negative voltage.

In an expedient practical embodiment of the driver circuit in accordance with the invention, in the switched-on state of the glow plug serving as a sensor, one plug end is connected to the positive terminal and the other plug end is connected to the negative terminal (ground) of the power supply.

The grounded end of the glow plug serving as the sensor can in particular be connected to the cylinder head or to the interior wall of the cylinder.

In an expedient practical embodiment, one end of the measurement resistor is connected to the grounded end of the glow plug serving as a sensor and its other end is connected to the capacitor which is in turn connected to the end of the glow plug not connected to ground.

The means for the restricting of the negative voltage generated at the capacitor preferably includes at least one Zener diode. The relative Zener diode is preferably connected in parallel to the capacitor.

The means for the prevention of a positive voltage at the capacitor advantageously includes a diode. This diode can, for example, simultaneously be formed by the Zener diode for the restriction of the negative voltage generated at the capacitor which serves both for the restriction of the negative voltage and the prevention of a positive voltage. The diode or Zener diode is preferably switched parallel to the capacitor.

The means for the bridging of the measurement resistor on the switching off of the glow plug advantageously include a diode which is preferably connected in parallel to the measurement resistor.

The measurement resistor preferably has a relatively high resistance value which can lie, for example, in a range of approximately 500 kΩ.

BRIEF DESCRIPTION OF THE DRAWINGS

The invention will be explained in more detail in the following with reference to an embodiment and to the drawing.

DESCRIPTION OF THE PREFERRED EMBODIMENT

The single FIGURE of the drawing shows, in a schematic representation, an exemplary embodiment of a driver circuit 10 in accordance with the invention for an ion measurement device associated with a cylinder of a diesel engine for the measurement of the conductivity of the combustion gas present in the cylinder. As can be seen from the following, a negative voltage can be applied to a glow plug 12 serving as a sensor and associated with the cylinder for a respective ion measurement by such a driver circuit 10.

As can be recognized with reference to the FIGURE, the glow plug 12 serving as the sensor for the ion measurement includes an internal resistor 14, an internal inductance 16 and an internal diode 18.

The negative voltage is generated by means of a capacitor 20 which is appropriately charged each time the glow plug 12 is switched off, i.e. for example after a respective separation of the glow plug 12 from the power supply 22 of the relevant motor vehicle, via the magnetic energy stored in the internal inductance 16 of the glow plug 12.

Means are provided by which the negative voltage generated at the capacitor 20 is restricted to a pre-set value. In the present case, these means include, for example, a Zener diode 24 which is preferably connected in parallel to the capacitor 20.

Means are moreover provided which prevent a positive voltage being generated at the capacitor 20 by a corresponding charging thereof. In the present case, these means include, for example, a diode, which is formed, for example, by the Zener diode 24 for the restriction of the negative voltage which is generated at the capacitor 20 and which thus serves both for the restriction of the negative voltage and the prevention of a positive voltage.

As can be recognized with reference to the single FIGURE, the glow plug 12 serving as the sensor for the ion measurement is connected to a measurement resistor 26. The negative voltage generated by means of the capacitor 20 can be applied to a series circuit 12, 26 including the glow charge 12 and the measurement resistor 26.

Means are moreover provided by which the measurement resistor 26 is bridged when the glow plug 12 serving as a sensor is switched off. In the present case, these means include, for example, a diode 28 which is preferably connected in parallel to the measurement resistor 26.

The measurement resistor 26 preferably includes a relatively high resistance value which can lie, for example, in the range of approximately 500 kΩ.

In the switched-on state, the glow plug 12 serving as the sensor is connected to the power supply 22. As can be recognized with reference to the FIG. 1, a positive voltage can be applied to the glow plug 12 via this power supply 22. The relevant voltage can, for example, amount to 12 V. Generally, however, other voltage values are also feasible.

In the switched-off state of the glow plug 12 serving as the sensor, the connection to the power supply 22 is interrupted. The relevant connection can be established or interrupted, for example, via a corresponding switch 30.

In the switched-on state of the glow plug 12 serving as the sensor, in the present embodiment one plug end 32 is connected to the positive terminal 34 and the other plug end 36 is connected to the negative terminal of the power supply 22 or the ground 38.

The grounded end 36 of the glow plug serving as the sensor can in particular be connected to the cylinder head or to the interior cylinder wall. As can be recognized with respect to the single FIGURE, the lower end of the measurement resistor 26 is connected to the grounded end 36 of the glow plug 12 serving as the sensor and its other end is connected to the capacitor 20 which is in turn connected to the end 32 of the glow plug 12 not connected to ground 38.

The invention claimed is:

1. A driver circuit for an ion measurement device associated with a cylinder of a diesel engine for the measurement of the conductivity of the combustion gas present in the cylinder, wherein a negative voltage can be applied by said driver circuit to a glow plug serving as a sensor and associated with the cylinder for a respective ion measurement, characterized in that the negative voltage is generated by means of a capacitor which is appropriately charged each time the glow plug is switched off via the magnetic energy stored in the internal inductance of the glow plug.

2. A driver circuit in accordance with claim 1, characterized in that, in the switched-on state of the glow plug serving as a sensor, one plug end is connected to the positive terminal and the other plug end is connected to the negative terminal of the power supply.

3. A driver circuit in accordance with claim 1, characterized in that the grounded end of the glow plug serving as a sensor is connected to the cylinder head or to the interior cylinder wall.

4. A driver circuit in accordance with claim 1, characterized in that means are provided by which the negative voltage generated at the capacitor is restricted to a pre-set value.

5. A driver circuit in accordance with claim 4, characterized in that the means for the restriction of the negative voltage generated at the capacitor includes at least one Zener diode.

6. A driver circuit in accordance with claim 5, characterized in that the Zener diode is connected parallel to the capacitor.

7. A driver circuit in accordance with claim 1, characterized in that means are provided which prevent a positive voltage being generated at the capacitor by a corresponding charging thereof.

8. A driver circuit in accordance with claim 7, characterized in that the means for the prevention of a positive voltage at the capacitor includes at least one diode.

9. A driver circuit in accordance with claim 8, characterized in that the diode is formed by the Zener diode for the restriction of the negative voltage generated at the capacitor, which thus serves both for the restriction of the negative voltage and for the prevention of a positive voltage.

10. A driver circuit in accordance with claim 8, characterized in that the diode is connected in parallel to the capacitor.

11. A driver circuit in accordance with claim 1, characterized in that the glow plug serving as a sensor is connected to a measurement resistor.

12. A driver circuit in accordance with claim 11, characterized in that the negative voltage generated by means of the capacitor can be applied to a series circuit including the glow plug and the measurement resistor.

13. A driver circuit in accordance with claim 11, characterized in that one end of the measurement resistor is connected to the grounded end of the glow plug serving as a sensor and its other end is connected to the capacitor which is in turn connected to the end of the glow plug not connected to ground.

14. A driver circuit in accordance with claim 11, characterized in that the measurement resistor has a resistance value of approximately 500 kΩ.

15. A driver circuit in accordance with claim 11, characterized in that means are provided by which the measurement resistor is bridged when the glow plug serving as the sensor is switched off.

16. A driver circuit in accordance with claim 15, characterized in that the means for the bridging of the measurement resistor on the switching off of the glow plug includes at least one diode.

17. A driver circuit in accordance with claim 16, characterized in that the diode is connected in parallel to the measurement resistor.

18. A driver circuit in accordance with claim 1, characterized in that the glow plug serving as a sensor is connected in the switched-on state to a power supply of a motor vehicle.

19. A driver circuit in accordance with claim 18, characterized in that a positive voltage can be applied to the glow plug via the power supply.

20. A driver circuit in accordance with claim 18, characterized in that, in the switched-off state of the glow plug serving as a sensor, the connection to the power supply is interrupted.

* * * * *